(12) United States Patent
Samid

(10) Patent No.: US 11,188,886 B2
(45) Date of Patent: Nov. 30, 2021

(54) IOTPAY: CONTINUOUS, VARIABLE-RATE, HIGH-RES, DEVICE-TO-DEVICE PAYMENT SYSTEM

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 17/207,694

(22) Filed: Mar. 21, 2021

(65) Prior Publication Data

US 2021/0233044 A1  Jul. 29, 2021

Related U.S. Application Data

(63) Continuation of application No. 15/582,784, filed on May 1, 2017, now Pat. No. 10,956,878, which is a continuation of application No. 14/352,994, filed as application No. PCT/US2012/061331 on Oct. 22, 2012, now abandoned, which is a continuation-in-part of application No. 15/337,203, filed on Oct. 28, 2016, now abandoned, which is a continuation of application No. 14/737,924, filed on Jun. 12, 2015, now abandoned, which is a continuation of application No. 13/529,399, filed on Jun. 21, 2012, now abandoned, which is a continuation of application No. 12/081,412, filed on Apr. 15, 2008, now Pat. No. 8,229,859.

(60) Provisional application No. 61/627,977, filed on Oct. 22, 2011, provisional application No. 61/688,788, filed on May 22, 2012, provisional application No. 60/907,869, filed on Apr. 19, 2007, provisional application No. 60/960,672, filed on Oct. 9, 2007.

(51) Int. Cl.
| | | |
|---|---|---|
| G06Q 20/06 | (2012.01) | |
| G06Q 30/06 | (2012.01) | |
| G06Q 20/38 | (2012.01) | |
| G06Q 20/36 | (2012.01) | |
| G06Q 20/22 | (2012.01) | |
| G06Q 20/14 | (2012.01) | |

(52) U.S. Cl.
CPC ........ *G06Q 20/0655* (2013.01); *G06Q 20/065* (2013.01); *G06Q 20/145* (2013.01); *G06Q 20/29* (2013.01); *G06Q 20/3678* (2013.01); *G06Q 20/382* (2013.01); *G06Q 30/06* (2013.01)

(58) Field of Classification Search
None
See application file for complete search history.

(56) References Cited

U.S. PATENT DOCUMENTS

| | | | | |
|---|---|---|---|---|
| 4,206,405 A * | 6/1980 | Pentecost | ............. | G01R 21/007 324/103 R |
| 5,857,023 A * | 1/1999 | Demers | ................... | G06Q 20/10 705/78 |
| 7,975,003 B1 * | 7/2011 | Lee | ......................... | G06Q 20/12 709/203 |
| 2002/0032651 A1 * | 3/2002 | Embrey | ................. | G06Q 20/02 705/40 |

(Continued)

OTHER PUBLICATIONS

"MIT Scheme Reference—Bit Strings", Jul. 22, 2021 (Year: 2021).*

*Primary Examiner* — Jacob C. Coppola
*Assistant Examiner* — Timothy Paul Sax

(57) ABSTRACT

Replacing discrete digital coin payment with a continuous payment flow to be used between devices on the Internet of Things. This pay-as-you-go, real-time payment regimen accommodates continuous, variable rate payment with no subsequent invoicing burden.

8 Claims, 8 Drawing Sheets

Discrete Coin Payment:

IOTpay Payment:

IOTpay v. Discrete Coin Payment

(56) References Cited

U.S. PATENT DOCUMENTS

2012/0191553 A1\* 7/2012 Sathe ............ G06Q 10/063116
705/16

\* cited by examiner

Discrete Coin Payment:

IOTpay Payment:

IOTpay v. Discrete Coin Payment

IOT payment Curve v. Discrete Coin Payment

IOTpay Vehicle "Charge and pay"

IOTPAY: CONTINUOUS, VARIABLE-RATE, HIGH-RES, DEVICE-TO-DEVICE PAYMENT SYSTEM

Continuation Of U.S. patent application Ser. No. 15/582,784 filed May 1, 2017

This application is also a continuation of U.S. patent application Ser. No. 14/352,994, filed on Apr. 18, 2014 as national stage application of PCT/US2012/061331, filed on Oct. 22, 2012, which claims the benefit of U.S. Provisional Patent Application Ser. No. 61/627,977, filed Oct. 22, 2011 and U.S. Provisional Patent Application No. 61/688,788, filed May 22, 2012.

This application is also a continuation-in-part of U.S. patent application Ser. No. 15/337,203, filed Oct. 28, 2016, which is a continuation of U.S. patent application Ser. No. 14/737,924, filed Jun. 12, 2015, which is a continuation of U.S. patent application Ser. No. 13/529,399, filed Jun. 21, 2012, which is a continuation of U.S. patent application Ser. No. 12/081,412, filed Apr. 15, 2008, now U.S. Pat. No. 8,229,859, which claims the benefit of U.S. Provisional Patent Application Ser. No. 60/960,672, filed Oct. 9, 2007 and U.S. Provisional Patent Application No. 60/907,869, filed Apr. 19, 2007, all of which are incorporated by reference in their entireties.

STATEMENT REGARDING FEDERALLY SPONSORED RESEARCH OR DEVELOPMENT

Not Applicable.

BRIEF SUMMARY OF THE INVENTION

This invention enables device-to-device, fast, real-time payment in a continuous, variable rate mode, with no subsequent invoices, anonymity is optional. It is effected through bit flow rate, where the identities if the bits {0,1} is reserved to attach identity to the paid money to insure the validity of the payment. Bits flow from payor-device to payee-device as fast as required. Per bit monetary value can be adjusted to any payment resolution without limitation. This enables instant, fast, micro, even nano payments to be made real time for instant, fast, micro even nano services and goods delivered—closing the transaction real time, no need for subsequent invoicing, delayed payment, nor the burden of collection and enforcement. Pay-as-you-go, pay-and-forget is a big advantage in today's high-tech world. These payments may be made anonymously because the value is carried by the combined identities of the bits regardless of their owner. Payment may be made conditional, if so desired, may be made via secure and personalized wallets, may be fitted in cars, and other instruments, embedded in a larger apparatus. When applied to solar cells contributing to the grid, IOTpay will facilitate the monetary side of these transactions. The simplicity and the accuracy of bit flow, which represents money flow in the simplest mathematical form, is the advantage of this invention.

REFERENCE TO SEQUENCE LISTING, A TABLE, OR A COMPUTER PROGRAM LISTING COMPACT DISK APPENDIX

Not Applicable.

BACKGROUND OF THE INVENTION

Billions of Internet of Things (IOT) devices are being interwoven into modern life. These devices exchange services on a global scale. These services are payable. The need arises for a payment solution that would be a-priori designed to meet the special need of IOT payment: high-resolution, fast, continuous, variable rates, secure, optionally anonymous, on a pay-as-you-go basis without the burden of subsequent invoicing, collecting, enforcing. The existential threat of climate change can be met by millions of people installing photovoltaic cells on their roofs, selling power to the grid in very small, highly irregular bursts. These transactions require an efficient way to insure real time frictionless payment. This is the challenge addressed by this invention.

SPECIFICATIONS

Increasingly people and instruments face high-speed high-resolution, continuous, variable rate payment requirements where traditional payment procedures can't cope. This invention of digital money is exceptionally fitting to meet such demands on account of its basic idea of bit-count as value metric: bits can flow from payor's device to payee' device as fast as required; bit-value can be adjusted to any payment resolution without limitation. This enables instant, fast, micro, even nano payments to be made real time for instant, fast, micro even nano services and goods delivered—closing the transaction real time, no need for subsequent invoicing, delayed payment and the burden of verification, collection and enforcement. Pay-as-you-go, pay-and-forget is a big advantage in today's high-tech world. When applied to solar cells contributing to the grid IOTpay will facilitate the monetary side of these transactions. These payments may be made anonymously, if so desired, may be made conditional if necessary, may be made via secure and personalized wallets, may be fitted in cars, and other instruments, embedded in a larger apparatus. The simplicity and the accuracy of bit flow, which represents money flow in the simplest mathematical form is the advantage of this invention.

This figure exhibits nominal digital payment proceeding from one discrete digital coin to the next, where each coin has a header, a payload, and a trailer. The payload is the money bits. By contrast IOTpay payment happens through a single header containing information about the digital payment and the mint that backs them up, followed by a string of bits that expresses the payload. The payment is continuous, no waste of trailer and another header bits, only payload flows from payer to payee.

Figure 1:
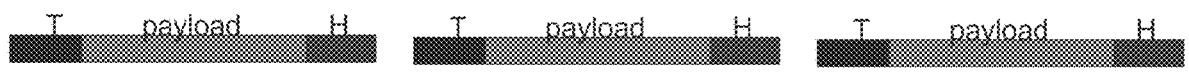
FIG. 1: IOTpay v. Discrete Coin Payment
Figure 1:
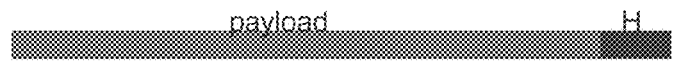
Figure 2:
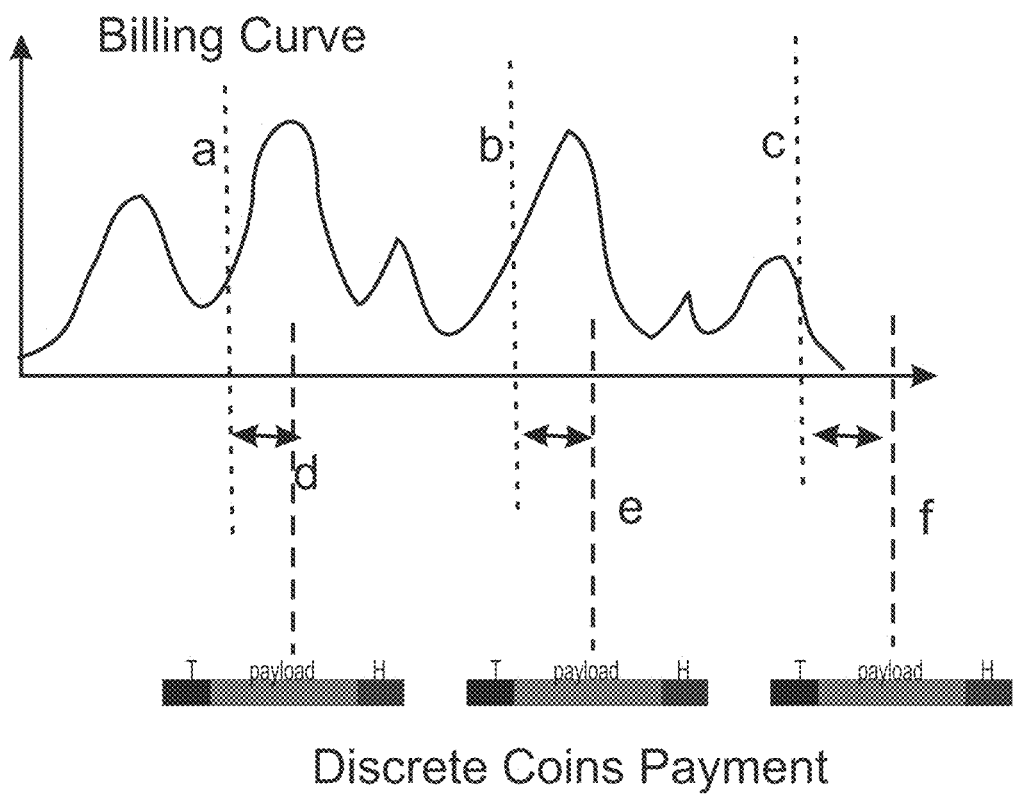
Figure 2:
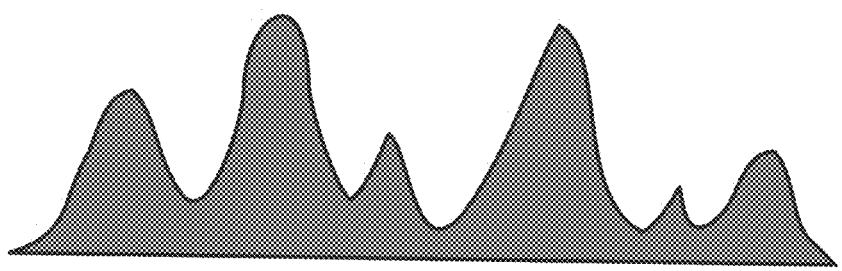

FIG. 2 IOT Payment Curve v. Discrete Coin Payment

This figures regards billing device and a paying device. This figure shows at the top a billing curve: billing rate is variable, changes over time. These changes may be effected by a variety of factors. In order to satisfy the billing requirement the paying device, using discrete coins will have to integrate the billing requirement over time. Line a shows an integration interval from the left start of the curve. The payer will accumulate the billing over that time frame, then, it will take it a period of time to prepare the payment package, until at the point marked with line d, the paying device is pushing a coin to the billing device. The billing device now needs to also perform an integration over the same period of time 0 to (a), and then check and validate the paid coin for that period. Next the paying device will have to integrate the billing from point of time marked with line (a) to point of time marked by line (b), and again take time to prepare a coin package to deliver to the billing device at time point e, and the same goes on, integration, and discrete coin preparation. Each discrete coin is comprised of a header data, a payload, and a trailer data.

By contrast, the IOTpay device will discharge payload bits to match the billing curve. No integration necessary, no revalidation of coins. The devices can disengage at any moment, and no one is left with any debt to the other or any credit either. Everything is paid right, in a way to match the billing. It is geared towards highly variable pay rates, short pay times, and small or large payments.

Figure 3:
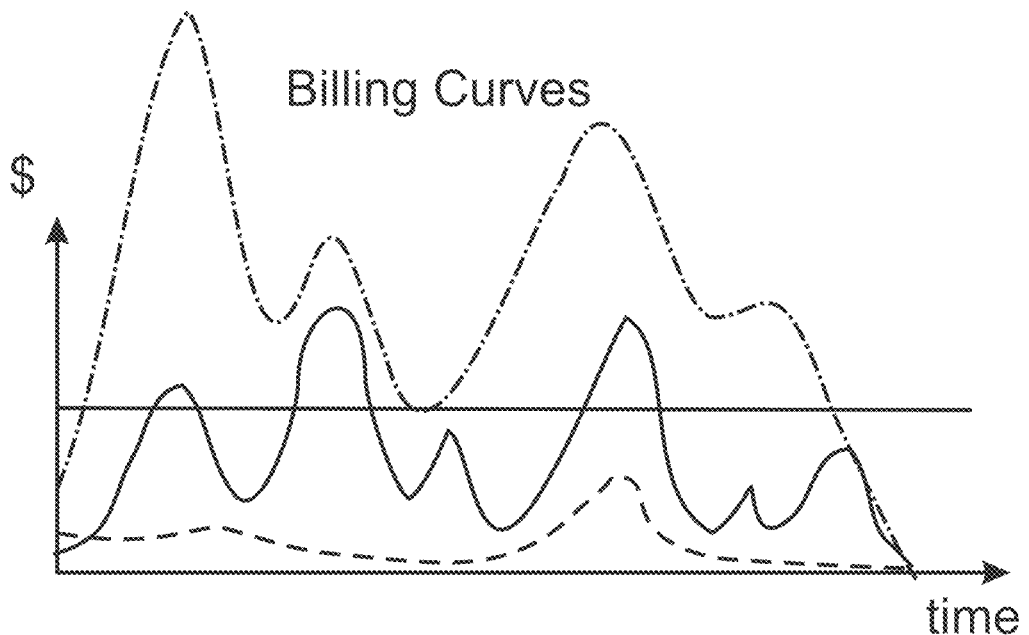

FIG. 3 Subscription Unfairness

This figure shows pattern of usage of some service as exhibited over time by three users. When the service provider does not have the 'pay as you go' option offered by IOTpay then a standard subscription fee is billed to all users, depicted by the horizontal line on the $-time graph. This is unfair to the low user depicted with broken line, and it gives an unfair advantage to the heavy user, depicted by the dotted line. Using IOTpay each user will pay exactly per actual use, and pay real time.

Figure 4:
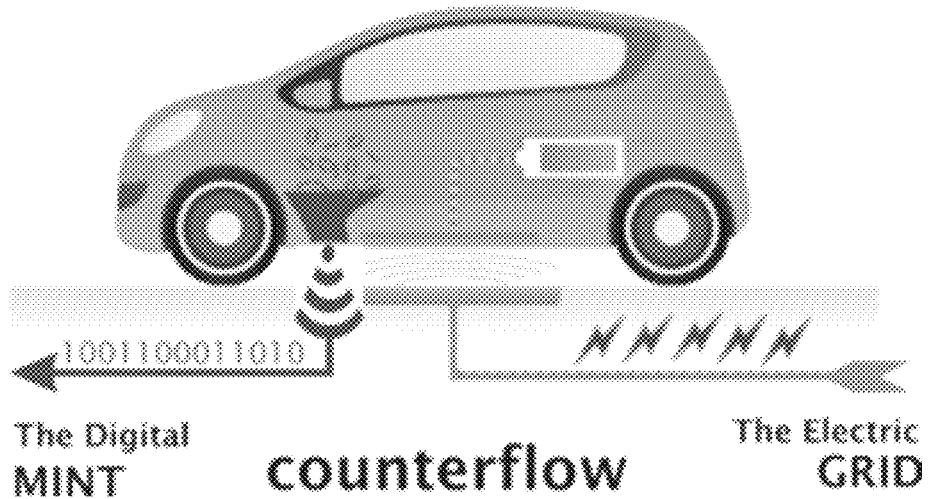

FIG. 4: Electrical Car Charging

This figure shows an electrical vehicle in motion as an underground charger charges the battery and is being IOTpay paid real time.

Figure 5:
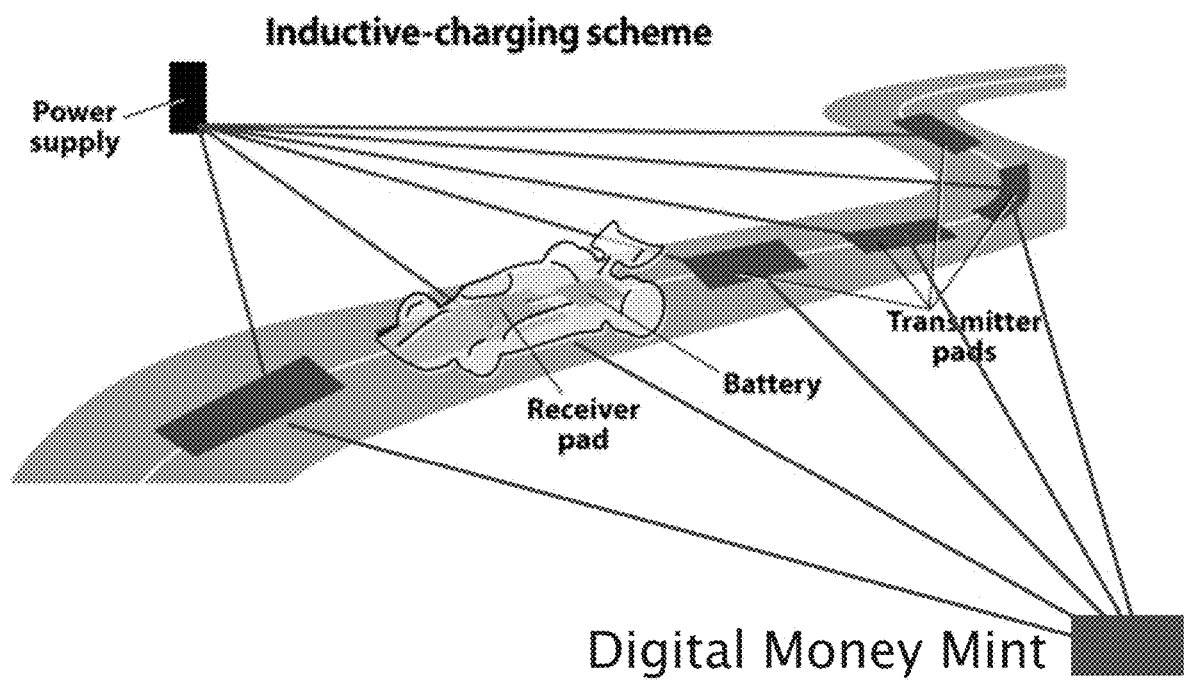

FIG. 5: Inductive Charging Scheme

This figure shows a road with underground electromagnets that charge a passing car. The electromagnets are fed from a power supply, and they are also connected to a central digital money mint to process the IOTpay payment paid to the underground facilities from the passing cars as they are being charged—real time IOTpay.

Figure 6:
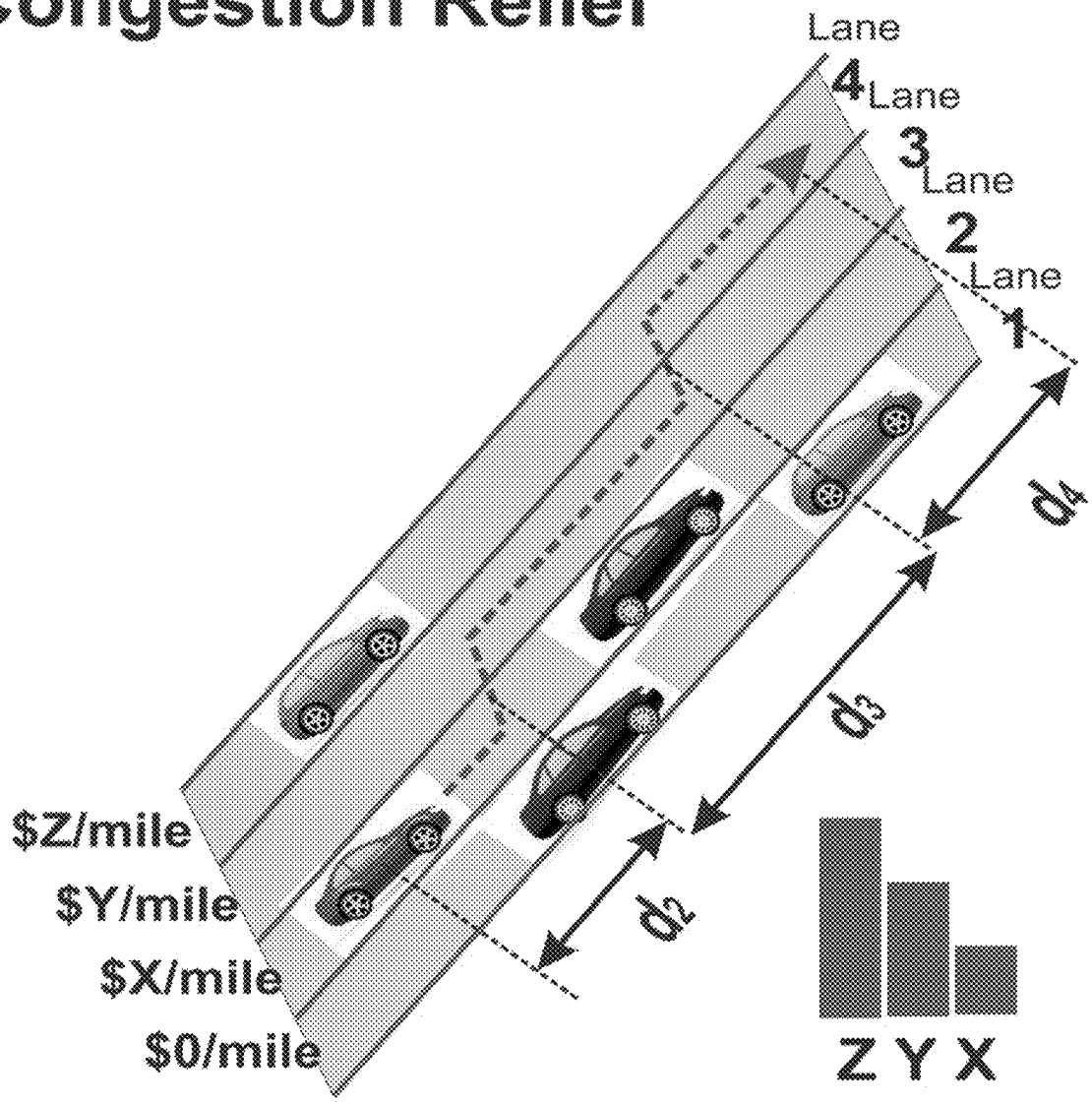

FIG. 6: Congestion Relief

The figure shows the use of IOTpay for traffic management over a multi-lane highway. Drivers can choose which lane to use. Some lanes are more expensive than others. This creates a congestion gradient where the expensive lanes are less populated and hence less congested. The payment is exercised from the IOT device on the vehicle to the IOT receptacle underground. The billing changes from lane to lane. The figure shows one car navigating from lane to lane, driving distance d2 on lane 2, distance d3 on lane 3, and distance d4 on lane 4, where X, Y. Z, are the corresponding rates. This facilitation is a case in point for instant, fast, variable rate payment—a perfect match for the IOT capabilities.

Figure 7:
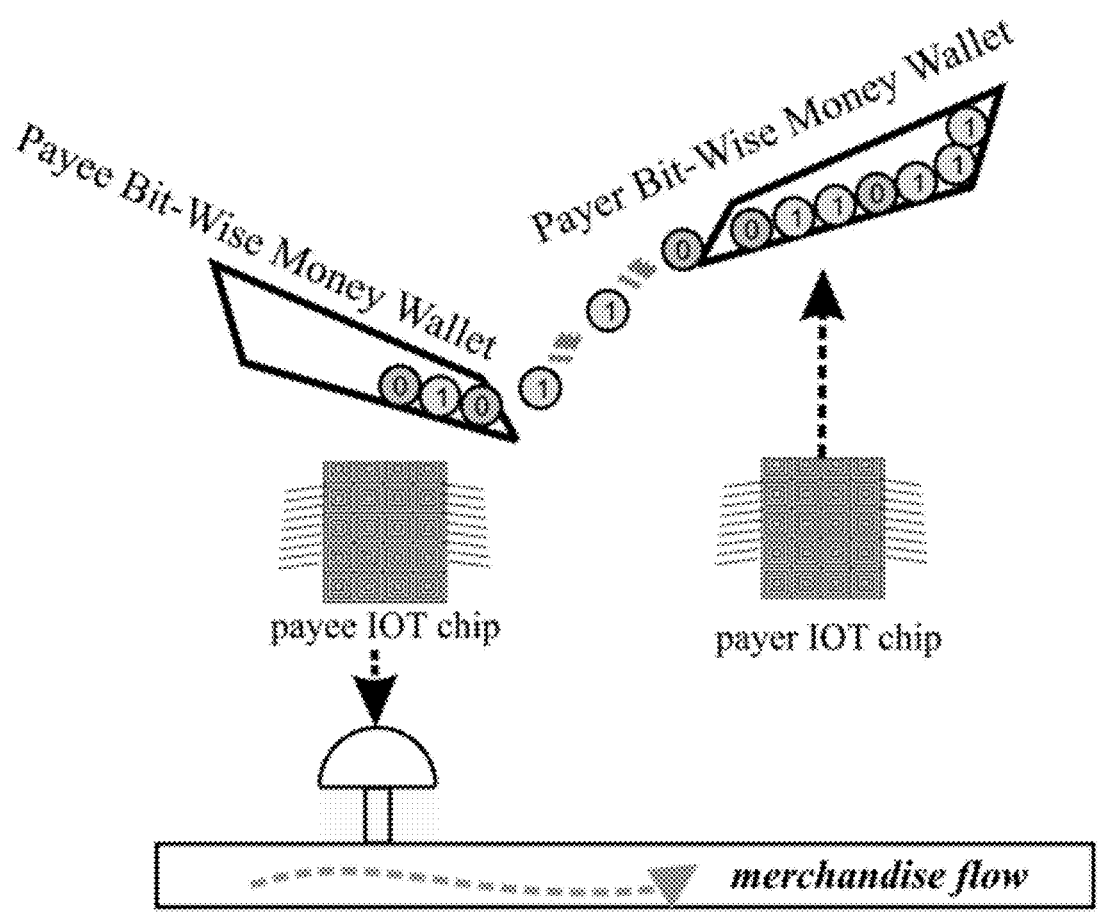

FIG. 7 Frictionless Payment, Continuous Pay-as-You-Go!

The figure shows the wallets of the payor device and the payee device. It shows the bits of varying identities flow from the payor wallet to the payee wallet. The payee wallet in turn controls the supply of paid goods.

Figure 8:

FIG. 8: IOTpay Vehicle "Charge and Pay"

This figure shows on the upper right side an icon indicating to visitors that this location is fitted with IOTpay "Charge and Pay" option. The upper left side shows the electrical charge head fitted with an IOTpay contact point that fits into the IOTcontact point on the charge interface on the vehicle, and the bit flow (counter to the charge flow) is indicated with a dotted line. The bottom of the figure shows the driver visible dashboard. Along with the normal indicators, the IOTpay logo is lit when the car is charged, whether while stationed or while driving over an underground charging electromagnet. Below the IOTpay logo the driver reads the money reserve left in the car.

Figure 9:
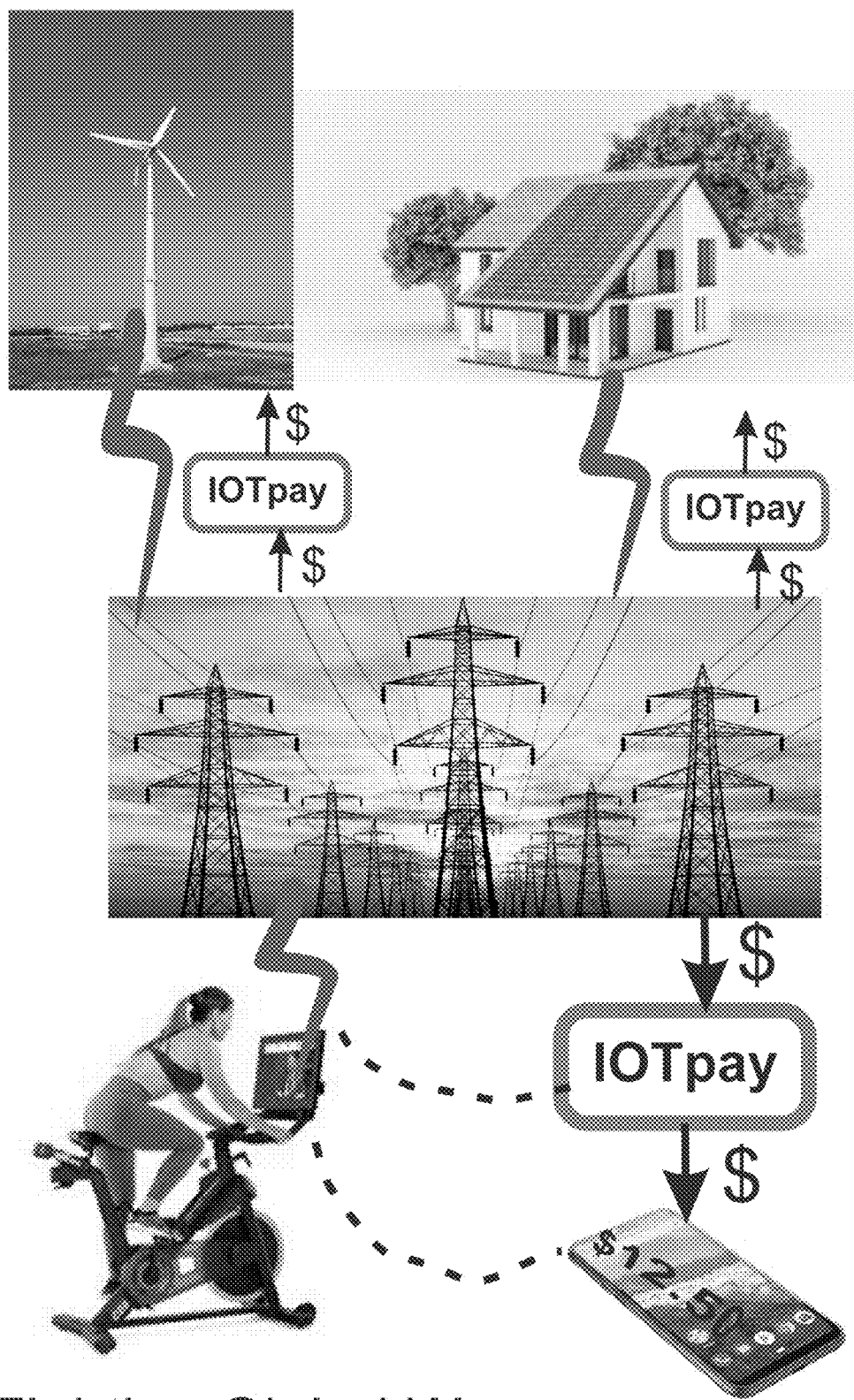

FIG. 9: Fighting Global Warming

This figure shows the grid in the center, and power-generators selling power to it. We see a house with photovoltaic panels feeding into the grid. At a particular moment the sun is hot, the residents are not at home, and the total power generation on the roof is more that the house appliances use. A sudden surplus is being generated. With proper apparatus this extra power will be fed into the grid, and will be paid for on the spot. Next minute a big cloud passes by, and there is no more extra power to sell. The rate of power flow to the grid comes down fast, but the IOTpay is perfectly engineered to follow on this variable pay rate, and insure a fair transaction. The same happens with the local windmill in someone' ranch. When the wind blows, a sudden surplus of power presents itself and is directed to the grid, with the IOTpay tracing its amount instant after instant. The bottom of the figure shows an exercise bike, equipped with a dynamo that feeds power to the grid. The apparatus that facilitate this transaction is fitted with IOTpay that connects through Bluetooth with the biker's phone, and shows up as ready cash on her screen.

INTRODUCTION

Today's payment protocols are complex multi-step procedures involving payor, payee, payor account holder and payee account holder, as well as an information network to facilitate the exchange. These procedures are slow, error-prone, and hack-vulnerable. At the same time we surround ourselves with devices, mostly part of the Internet of Things, and these devices exchange payable services, requiring payment solutions that fit the new requirements which typically include instant payment, fast payment, high-resolution payment, continuous variable-rate payment, anonymous payment and secure payment. No mainstay payment today can properly satisfy even some of these requirements.

That is the background on which this invention, dubbed IOTpay, is to be seen. By design the IOTpay procedure is the fastest possible, secure, instant, high-resolution payment, variable-rate continuous payment, at-will anonymity payments, to meet any payment requirement posed by modern cyber space. What else is important is that IOTpay is without administrative tails, as is usually the case with nominal payment systems.

The majority of human engaged payment is for known merchandise of known price. The payor can prepare the digital package to deliver to the payee as payment. The price is known and specified and so is the identity of the payor (the source), and some identification of this particular transaction. The package is received by the payee and processed. In peer-dependent crypto transactions the process involves peers participation which adds a complication to the process. In legacy payment, the digital package contains information for account adjusting for both the payor and the payee.

This configuration is not very amenable to device-to-device payment. In the Internet of Things (IoT) world we have the following terms:

1. Instant Surprise Engagement Between Devices

The IoT is a huge public square with billions of devices roaming around. These devices engage and "live" in service of society. They can reach one to the other across the planet, and in a surprise way a service requesting device hooks up with a service providing device.

2. Instant Requirement for Payment

Following the surprise device to device engagement, goods are exchanged and in an instant, a requirement for payment arises. It was not there an instant earlier, it was not anticipated, it pops up as a surprise: a demand for payment from a service-provide-device to a service-requesting-device.

3. Variable Payment Rate

The payment requirement may reference a discrete item to be passed on to the buyer, but often it is service to be billed at variable rates. The rate may be determined by a variety of factors: it may be responsive to the rate of flow of digital goods, it may be varied based on time of the day, it may be varied by load factors, on same or similar transactions, and it may reflect policy or behavior inducing influence, etc. Instant rate variance is not very well handled by discrete coin payment because it requires a slowdown due to integration. IoTpay is exceptionally adept to handle rate variance.

4. Extreme High Resolution Payment

Human payment is inching up to low resolution. Quarters, dimes and cents disappear from the table. Alas, devices often engage in a myriad of very fast exchange of goods, where the payment per transaction is very low, may be several orders of magnitude smaller than the unit current (1$). Traditional discrete coin payments become unworkable for such low payment. First the cost of setting up the payment, verifying the payment and handling the administrative tail of the payment is too costly compared to the value of the transaction. Second: the amount of bits needed to effect the transaction per $1 paid is way too high. The IoT payment, by contrast is by design adept to any micro or nano payment however small.

5. Anonymity Requirement Payment

Micro transactions between devices have no anti money laundring value, and as such the main argument for breach of anonymity for large payments, is summarily nullified. On the other hand, the large variety of micro transactions if attributed to a particular owner of the involved devices, amounts to a detailed "bread crumbs" pathway, exposing free citizens as to where they go, what they do, who they consult etc. It is therefore that it is necessary to effect a payment solution that will not accumulate such privacy invading data mass. It is practically infeasible to effect anonymity in legacy payment systems, but IOTpay is well suited for this objective.

6. Ultra Fast Transaction Time

Surprise, instant, micro transactions, are also often fast; engagement is short lived, followed by instant disengagement, often never to meet again. In this brief time period, two things must start proceed and conclude: the purchased goods must transfer from seller to buyer, and the due payment must pass from payor to payee. No time to prepare, or to finish-up: sell, pay, and part ways!

7. Payment with No Administrative Tail

No one can well handle an invoice for a sub-cent transaction that occurred some three weeks ago. No one wishes to handle financial books on myriad of micro transactions that need to close and to settle. Such overhead will overload the system. IoT payments have no administrative tail.

IOTpay MEETING THE TERMS

The forest of TOT devices with the remarkable capability of having each device connect to any other device, and services exchanged in an instant demand mode, is an environment where devices should be preloaded with money to pay, and not just having an account number pointing to a third party that keeps the money for that device. IOTpay is not account base, it is money in the device, ready to be paid.

The big advantage of IOTpay comes to pass to meet situations where the billing curve is highly variable. Namely the cost per second or minute changes much. There are various reasons for such variability, as is elaborated below. Discrete payments of coins is much more complex than IOTpay. Billing has to be integrated over time, a digital coin for the integrated amount has to be constructed and then delivered to the recipient, who in turn has to check it out, validate it, and store it for any dispute settlement that may be needed. By contrast the IOTpay involves simply a faster or slower rate of streaming payload bits to the recipient.

Many services may be parceled out to 'atomic' levels, providing service valued at sub-cents. If such payment is discrete, then it will be too costly to prepare and handle the full structure of a discrete coin in order to effect such a payment. The smaller the amount paid, and the more of those small payments, the more burdened and the more unattractive the discrete coin payment is. By contrast the IOTpay may assign dollar value per bit, at any desired rate, so however small the pay, the bit flow will be of the desired rate, only the dollar value of each bit will be different.

APPLICATIONS

Categories:
Timed Personal Services
Embedded Transactions
Crowd Control
Precise-Time Payment
Utility Payment

TIMED PERSONAL SERVICES

These services range from high-level consultations to routine services like transportation. One would engage a tax consultant, a legal adviser, a psycho-therapist whether in person or virtually, while having an IOTpay device hooked to the service provider device and the money flow in the agreed upon rate minute by minute, second by second.

Another big class of personal services is subscriptions-alternative. Today major newspapers sell subscriptions on a monthly or yearly basis. This mode penalizes the low user and advantages the heavy user. Same for subscription for with movie streaming outlets. IOTpay will bring fairness, build the business further because it will reduce the entry threshold, and offer controlled anonymity to the customers.

The advantage of IOTpay is that the payment itself will not expose the identity of the customer. Whether or not such identity is known to the service provider is a question to be decided on its merit, and not forced to be exposed by the act of payment.

The option to get services incognito is very important in all sorts of dire situation, and the IOTpay technology helps.

The ability to make payment with as little exchange as possible for simplicity, speed, error-rejection, and attack-countermeasures is important. IOTpay can be exercised with such minimum without burdening it with identity related administrative data.

There are numerous situations where the IOTpay has a clear advantage, related to basic services. Examples:
physical exercise installations
WiFI service
Internet data flow
fast lane access on highways
parking meters.

EMBEDDED TRANSACTIONS

The billions of IOT devices that are being added around us daily, are evolving to a complex relationship where devices buy and sell goods and services to each other following established protocols. So one device will be drone attached camera over a city, and another device will hire its bearing towards a particular area of the city over a particular measure of time, and buy the related video—and pay per streaming video bits. Another device will ask a high powered computer to solve a computational task and pay for time it took to process; a third device will ask for search in a large data base for a particular item, etc. All these transactions can be put on a strict economic basis using the effective IOTpay protocol to effect payment that is instant, fast, anonymous, high-res, and variable rate. One important and emerging embedded application is while-driving-electrical-vehicle charging

While-Driving-Electrical-Vehicle-Charging

A car driving fast over an underground electromagnet will be charged by it to a certain degree, but it all happens in a fraction of a second. The only practical way to pay real-time for that charge may be through IOTpay.

Rate Adjustment as Behavior Control

One way to move people to behave in a certain way is to charge them in proportion to their steering away from the 'desired mode'. By using IOTpay to charge at continually increasing rates, such aim can be achieved. For example: cars will be required to be hooked to an IOTpay money stick. When the speedometer will rise above the speed limit in a particular road spot, the car will start to drain the IOT money bits and send them to the cloud's account of the relevant taxing authority. A rate increase formula will accelerate the drain of money bits according to how long the speed limit is violated and to what extent. The drained charges will be displayed on the driver's dashboard to eventually call the driver to compliance.

CROWD CONTROL

Entrance to mass transportation, to sports stadium, has hundreds of people streaming through gates, and currently often held back in large queues waiting for payment to be effected so access can be granted. All these situations can be alleviated with the IOTpay protocol where the bits flow instantly.

PRECISE-TIME PAYMENT

In bidding situations, the stock market and similar investment situations it is extremely important to make an exact payment at a precise moment. Most legacy payments come with delayed settlement, and most crypto transactions require time for the peers to come forth. The IOTpay, can be used with great utility, although it is not the typical IoT transaction.

In a bidding situation two bidders 1 and 2 are bidding on a merchandise put on sale at time t=0. Both bidders offer the asking price—who will get the merchandise? The one who announced first or the one who settled the payment first? Using IOTpay the announcement and the payment can be united into a single instant, and the seller will honor the bidder who came first.

In that situation the sum to be paid, X, may be very large on one hand, and with high resolution on the other hand (e.g. $12,998,763.56). IOTpay could handle this efficiently using a multiple-parallel payment solution. Accordingly, the bidder will 'shoot' at the seller from 'three payment guns':
high denomination gun where 1 bit=$10,000
medium denomination gun where 1 bit=$100
low denomination gun where 1 bit=$0.01

The high-denomination gun will pass to the seller 1200 bits, The med-denomination gun will pass to the seller 9987 bits, The low-denomination gun will pass to the seller 6356 bits.

This will effect the exact payment:

$12,998,763.56=1200*($10,000)+9987*($100)+ 6356*($0.0)

and thereby both a high sum and high resolution payment is achieved, and with very few bits passed.

UTILITY PAYMENT

Utilities like electricity, gas, water are normally billed and collected. It would be more efficient to replace the meter with a meter-payment device where IOTpay solution will provide for a money loaded USB stick or similar device, to be hooked to the meter and pay-as-you-go per service used. And so if power is consumed late at night when it is cheaper the pay-as-you-go apparatus will 'devour' fewer bits than when same power is used in the mid afternoon. Also for electricity the IOTpay may be effected to facilitate selling power to the grid.

CLIMATE CHANGE

Climate change looms as an existential threat on humanity. Serious efforts are called for to replace fossil fuel with renewable sources: solar and wind. Modern technology allows for every day people to help by installing solar panels on their roofs, even a windmill where it is windy enough, and recently some physical exercise machines have been equipped with a power generating dynamo. We face a situation where millions of energy generation units play a role, and in particular sell power to the grid. To facilitate such a contribution it is necessary to fit the installations with an efficient payment solution and IOTpay fits right in. Credit bits will flow real time, at any resolution, converting to normal currency if so desired. The IOTpay setup is easy and cheap. It can be embedded in any power exchange box be it a stationary bike, or a small voltaic cell. And as such IOTpay technology will fit into the global battle to defeat the threat of climate change.

TECHNICAL ELABORATION

Continuous Payment:

Continuous payment is payment that happens continuously with the passage of time, paying, say US$0.1/second, or payment that happens for every occurrence of a chain of events. Some formations of digital money do not lend themselves towards continuous payment, but others do. Two important categories for continuous payments are:

(a) online services, and
(b) embedded services.

In an online service a user may hook a digital money-loaded USB stick to his machine, and dedicated software will adjust the value string of the coin to reflect the diminishing value of the coin over time, or over cost-counting events. This continuous mode may be used for paying for media per time of reading/viewing/listening, pay per advice and counseling, pay per maintenance and support.

Embedded application happens when a digital money loaded device is hooked into a car, or a meter of some kind, where the value string adjusts itself according to time past (say in parking), or per cost-marking events. The paid for service may be unique (like a personal legal advice), or it may be public, or broadcasted, like a movie, or a library. The paid rate may be flat, or it may be governed by a complex algorithm, and contingent upon the balance between supply and demand.

The advantage of this 'pay as you go' mode is that it works for micropayments, and that it voids the need for after-service invoicing, and bill collection. Traveling teachers or experts will use a device, which may be a small computer, or a phone, into which they will stick their customer's digital money stick, or device (USB or otherwise), and while they are teaching the money will flow from the stick to the device. At the end of the lesson the USB stick is disengaged, and the digital money correspondent to the payment shows up as a digital coin in the teacher's, or service provider computer.

Continuous payment may be used to fine tune car insurance premium. Today's automobiles are so computerized that they anyway accumulate driving data in real-time mode. That data can feed an algorithm that would determine payment to be siphoned away from a USB stick, and sent as payment to the insurance company. Safe drivers who drive in non-accidents prone neighborhoods, and drive less will pay less.

UTILITY PAYMENT

Digital Money Utility Payment

Home and industrial utilities like power, water, gas, sewer, steam, etc. are normally metered, and paid in response to a post-usage invoice. This setup is highly inefficient, and cumbersome compared to a pay-as-you-go option where no invoice must be prepared, nor mailed, then reviewed, and not eventually paid-up, and collected. We describe here how to use the coin-splitting technique described herein to offer a real-time utility payment solution Power supply, in particular, may be a two-way configuration where consumers generated power and wish to push it to the grid. A smart pay-as-you-go solution will have to allow for this configuration.

The Utility Payment Solution

The Utility Payment Solution is comprised of a real-time payment apparatus wherein value bits are paid simultaneously with the consumption of the consumed utility. It involves a nominal consumption meter for the paid utility, integrated with a payment module and a flow-controller, together referred to as the payment-meter.

The payment module is comprised of
(i) real-time payment calculator,
(ii) a meter interface,
(iii) a digital wallet,
(iv) a payment interface,
and optionally:
(v) payment display unit, and
(vi) payment register.

The Utility Payment Solution comes with two categories, modes:

Non-Real Time Mint Validation
and
Real-Time Mint Validation.

In the first category the metering and the payment is taking place by erasing or removing pre-purchased bits from the extract-value string, as it is being described in the coin-splitting section. No need for real-time payment contact with the payment center (the mint). In the latter category the meter communicates with the digital payment center to effect the payment. While the latter category offers greater security, it is also more complex, and more expensive.

In both categories, or modes, a real-time payment calculator will be determining the number of bits that must be paid for the ongoing consumption, and when the payment is stopped, the system will affect a usage controller to prevent theft of unpaid utility.

The display unit will inform the user in real time how he or she are doing—are they in the "green" or are they in the "red". Namely, are they paying right now too much, so may be the consumption can be reduced. This real time consumption rate is of particular interest for electrical power. It makes a big difference what time of the day electricity is consumed.

Non Real-Time Mint Validation Utility Payment

In this mode the consumption (flow) of a utility will be linked in real time to the destruction, burning, erasing, or removing of bits from the extract-value string, without the process of redeeming them by a real-time connection to the payment center (the mint). The key to the operation here is to insure that the burnt bits represent money and reflect either a purchase or a donation (validity).

The validity of the paid bits may be established by a combination of the following validation processes:
Source Validation
Identity Validation
Delayed Validation Source validation is a process where the device that supplies the bits is validated, and with it the burnt bits are assumed bona fide. In the identity validation the circuitry in the payment-meter will evaluate the identity of some of the supplied bits to insure that the bits supply source is proper. The used bits may be accumulated in the payment-meter for a non-real time, delayed examination which will flush out any fraud or abuse.

The source validation is usually practiced by trusting the integrity of a bits container, a wallet, that the bits it contains are bona fide payment bits. Something in the hardware, or the features of the wallet will provide that assurance for integrity. One of the industry established "cryptographic hand shaking" protocol will be carried out to insure the validity of the source without checking or validating the bits themselves. Bit identity validation may be carried out using the concept of under-randomness in which the bits appear random but are subject to a cryptographic validation based on their identity.

The Payment Module

The Payment module involves a nominal consumption meter for the paid utility, integrated with a payment module, together referred to as the payment-meter. The payment module is comprised of
   real-time payment calculator
   a meter-interface
   a payment interface
   a digital Wallet; and optionally:
   payment display unit
   payment register.

The payment module first gets a reading from the flow meter as to the flow rate of the paid utility. The reading may be analog and in that case it is converted to digital, or it may be already in digital format. This reading and potential conversion happens in the meter interface subsystem. The reading is then transferred as input to the payment module. The payment module incorporates all the factors used by its payment formula, and translates the flow reading to payment rates.

Real-Time Payment Calculator: The Real-Time Payment Calculator receives as input the rate of consumption of the paid utility, U* (in utility quantity units, U, divided to time unit, Δt.), and computes the rate of payment P* (bits per same unit of time Δt). This computation is based on: (i) time of payment, t, (ii) payment factors, F, (iii) and the rate formula, f:

$$P^* = f(U^*, t, F)$$

The payment factors may be static or dynamic. They may be locally sensed, or may be remotely communicated. Some factors may be downloaded from a central location, others may be communicated interactively from neighboring devices. The payment formula may need the detailed or integrated history of the utility flow. Time may refer to time of day, day of week, day of month, month and year. In its basic version the ratio P*/U* will be fixed and reflect how many payment bits are to be paid per a given consumption of the paid utility.

There is special consideration for power (electricity) payment. Power should cost more in peak times, and less in off hours. Power may be more expensive in days where the limit is approached, and less in calmer days. Rate may be dependent on the source of power.

TWO-WAYS UTILITY TRANSACTIONS

Purchase of Electrical Power

Electricity has unique features among nominal utilities:
(i) it can't be readily stored,
(ii) its cost of production depends on momentary demand,
(iii) it supports two-way flow,
(iv) it is supplied from various sources at different rates, and
(v) it is subject to proactive government incentive programs.

All these factors combine to a rather complex payment calculator, depending on a variety of factors.

Two-Ways Electricity Flow Payment: Electricity can be generated locally by consumers who are also connected to consume from the grid. The locally generated power may be used in lieu of the grid supply, and at time may exceed the supply, and may engender a new back-flow from the consumer to the grid. Such back-flow is necessary because electrical power does not store well.

The in-Lien Power Use

In that case the meter-payment system will have to include a two way supply: the grid, and the local supply. It will also include a selector that would give preference to the locally generated power ahead of the grid. The locally generated power may be free of charge or charged at a different rate. The payment module will compute the payment for each source.

Back-Flow Power Use

To accommodate this feature the payment module will include two 'cash registers' one for "spent bits" the other for "redeemed bits" also called "credit bits". As the grid supplies power, the payment bits are being consumed, but instead of erasing them or sending them off to the mint for validation, these bits will accumulate in the spent box up to a preset limit, S. This transfer of bits will follow the procedure described in the coin-splitting section. Once the limit of bit accumulation is reached, the additional spent bits will be erased or sent to mint as the case may be. If, at a given point the consumer connects with a power source (a battery, a dynamo connected to stationary bicycle, a backyard windmill, a solar system or alike), and the power he or she supplies exceeds their consumption at the time, then the overflow is sent as power source to the grid, and the grid will pay for it, per established rates. The payment calculator will take the reading of the amount of power supplied to the grid from the consumer and apply the rate formula to compute the amount of money to be credited to the consumer. That amount, translated to bit-count will be transferred real-time from the "spent box" to the "redeemed box" or "credit box" as it is also called. When the consumer, at a later point, resume purchasing power from the grid, then he first pays with the redeemed bits that accumulated in the 'redeemed' or credited cash register. When the redeemed box has exhausted its bits, the payment resumes from the latched bit container.

Digital Money Payment to Nominal Grid Suppliers

Two solutions are presented:
The non-real time connectivity solution.
The real-time connectivity solution

NON-REAL TIME CONNECTIVITY SOLUTIONS

The solution here involves:
(i) the power supplier,
(ii) the power company that buys electricity from the supplier, and
(iii) the Mint.
The devices needed are:
(a) a dedicated power-payment apparatus,
(b) a digital wallet, and
(c) a used-bits storage device.

The power supplier (i), connects to the grid, and the electricity flow is captured by a meter, and computed based on a variety of factors to credit in favor of the supplier. This credit is expressed as a number of bits. The meter-payment apparatus (a) will have a digital money bit holder (wallet) attached to it (b), and bits from it will flow per the computed measure to the used-bits storage device (c). However on their way from the wallet to the storage device [(a)->(b)] the bits will be encrypted with a cryptographic key that is securely embedded in the payment module.

At some arbitrary point in the process, the power supplier (i) will send the bits that accumulated in the used-bits storage device to the power company (ii). The power company will decrypt the bits sent to it, then send these bits to the mint (iii) to confirm that they are the true bits from a mint's wallet that was purchased for the purpose. This will serve as proof that those bits represent power that was supplied to the power company. Having been satisfied that it received the claimed power, the power company (ii) will then reimburse the power supplier for his power supply.

The power supplier buys a digital money stick (wallet) for a nominal fee, say N. When these bits are proven to have been extracted from the wallet against a measured amount of electricity supplied to the grid, then the supplier claims a payment from the power company for his supplied electricity. Let this payment be P. The difference (P–N) is the net payment to the supplier. The profit for the Mint is N plus any service fee the Mint will collect from the power company, S. The power company will pay (P+S) for the power it received, but there are no additional accounting efforts.

The integrity of this scheme is based on the hardware integrity of the meter-payment apparatus. Each such apparatus will be fitted with its own crypto key (using perhaps the same cipher). As long as the crypto key is not compromised, it is impossible for the power supplier to present the spent bits to the power company without them having been first processed by the meter-payment complex. It is noteworthy that the crypto key in the meter-payment apparatus is not known to the Mint. It is only known and used by the power company.

REAL-TIME CONNECTIVITY SOLUTION

Assuming a wide spread deployment of cell-phone towers, and Internet, one could build an IP-based payment solution. The consumers will buy payment sticks, latch them into the electronics of the solar energy contraption, and once the payment stick (wallet) is validated by the mint, it sends an activation signal to start consuming and paying for solar energy. In practice, the solar investor company may receive the coin id from the latched in digital coin, pass that data to the Mint, and when validated, the investor will send the activation signal to the solar supply. The activation will last as long that that latched digital coin has remaining bits.

A simpler, non-real-time-validation-by-the-investor solution is as follows: the meter-control electronics is linked to commensurate bit supply to facilitate payments. The identity of the bits is not real-time validated by the mint, and the integrity of the payment is maintained in other ways. Some of them are: Cryptographic Handshake and Secret identity The cryptographic handshake solution is based on wrapping the digital payment bits in a wallet, a "coin" that would have to identify itself as bona fide to the meter-payment electronic contraption at each user's site. In the simpler way there would be the same handshake for all sites, in the more advanced implementation, each site will have its own identification.

Any of the prevailing access and authentication protocols can be used to insure that the wallet that is being latched to effect the payment is a bona fide wallet, and not a false one. Preferably a challenge-response protocol will be used. So, for example, using a particular cipher the payment module will include a secret key that is secured via the hardware construction of the module. This will allow the payment module to use a random plaintext as a challenge to the wallet as it is being latched in. The wallet will encrypt the plaintext using its key, and send back the ciphertext. The payment module will also encrypt the random plaintext, and compare the two ciphertexts. if they agree, then the conclusion is that the wallet has the secret key, and hence is bona fide.

In this handshake mode the identities of the payment bits are not verified per se, what is verified is that they are coming out from a bona fide payment wallet, or coin, and hence are to be trusted. These payment bits as they are being used, consumed, by the payment module, they don't go anywhere, and they are simply discarded. The payment is effected when the user is buying the wallet.

In the secret identity mode of non-real-time bit verification mode, the very identity of the payment bits only looks random, but in fact is pseudo-random, and is very carefully contrived. Using common cryptographic means one would mint as many coins as necessary. When each of these properly minted coins is served as a bit payment source then the payment module verifies its bona fide status, and allows for the payment to proceed. If the test fails, namely the identities of the payment bits are not passing the crypto test, then the payment is stopped, and the power supply is shut down.

A Meter Interface: The meter interface (i) reads the utility consumption rate from the meter, (ii) it communicates with the other components of the payment module, and (iii) it sends a "GO/No-GO" signal to the flow-control module indicating whether the utility is allowed to flow normally, to flow under constraints, or to stop altogether.

A Digital mint (payment) Interface: The payment interface receives the real time bit payment needed to pay for the real-time consumption of the paid utility. The input is the number of bits needed to effect the payment. These bits are extracted by this interface from the Digital payment wallet—the coin—the Digital payment stick that houses the payment bits to be paid. Following their extraction from the wallet three options are possible depending on the implementation scheme: erasure, dispatching to a dedicated spent bits container, communicating the bits for real-time payment validation.

Erasing the bits is the simplest operation. The bits are then irretrievable. Dispatching to a dedicated spent bits container may be used in two options: for delayed validation and for payment reversal Payment of utility may be implemented with a delayed validation of the spent bits. It may be too burdensome to real time validate the bits, and in that case one would take the spent bits every so often to a communication station, and validate the bit identity after its use. If there is a problem then per policy, an invoice will be sent, or the service will be cut off, equipment removed, etc.

We have seen that in case of electrical power, the user might have an occasion to sell the power company some electricity generated by him or her. In that case the user, or consumer will earn credit, and that would be in the form of pulling bits out of the spent bits box and deposing them in a dedicated credit bits or redeemed bits box, from where the bits will be paid "again" when the consumer returns to buy power from the power company.

In real time applications, the payment interface will send the bits, through IP (Internet Protocol) for The mint to validate them real time. All these functions are covered by the payment interface.

A Payment Wallet: The wallet may be generic and simple for the case when the bits are real-time validated by The mint, or it may be at various levels of protection and sophistication if no such real time validation takes place. The risk for the non-real time validation is the replacement of a payment wallet by any random string of bits that are being extracted and disposed as if they were payment bits. To prevent this without real time validation or subsequent validation it is necessary for the wallet to project hardware integrity. The wallet will have to be constructed with features that would be required by the payment interface, and that without them the payment will not be carried out. These features should be difficult to emulate either on account of technological difficulty or on account of secrecy, or perhaps a combination.

Of particular interest may be the under-random digital coin in which the identity of the bits is not fully random, only under-random, namely the bits appear random to a viewer yet their construction is such that the payment interface will be able to distinguish between a bona fide Digitally minted coin, ("wallet"), and a look-alike. As explained here, the system offers a cryptographic assurance for the integrity of the paid bits.

Payment Display Unit: This unit is optional. It is designed to offer the user real time display of his use of the paid utility. The display may be an audio signal or a visual, or perhaps both.

Audio Usage Display: The idea here is to alert the user that the utility he so dearly pays for, is now rising in its consumption, and so perhaps it will make sense to shut some systems off. The signal may be a shrieking noise, or it may be a period alarming signal depending on the degree of consumption, or on the degree of attention required.

Visual Display: The visual display may range from a threesome dot light: green, yellow, red. indicating increasing level of consumption. It may be a colored graph, it may be a detailed table, or perhaps a combination of some of the above.

A numeric display might show rate of use at the moment, integrated use from a given reference point (early this day, this week, this month), and comparable or average figures.

In a more sophisticated version the payment unit may be fed from downstream consumption data (from downstream meters), and accordingly display advice to the user what is best to shut down.

Payment Register: The Payment Register complements the working registers of bit-boxes that are part of the payment unit. It may be used as an easy latch-on, latch-off for new and old bits. The removed bits may be sent to the mint for delayed validation.

Utility Flow Controller

The utility flow controller is a component that controls the flow of the paid utility. In its basic form it is simply a go/no-go device. If the consumed utility is properly paid for, its status is a 'go', if no payment was made (no bits available for payment), then the payment module unleashes a "No-GO!" signal, and the utility flow stops. It kicks back in the moment that fresh authorized Minted bits are available to the system.

The flow controller may have built in sophistication in the form of: delayed flow stop; rate of flow ceiling; or conditional flow.

The "delayed flow stop" action is simply a grace period, counted from the moment that no payment bits are available. The grace period may be indicated by an audible signal or other means to alert the user that his power, water, gas, etc. is about to be stopped.

The rate of flow ceiling is a mechanism whereby the controller allows only a preset consumption rate designed to prevent normal usage (until payment is made), yet, without imposing a total cut-off, which might have serious consequences to the unsaying user. So, for example, the power supply will be limited to support a refrigerator and some light bulbs, but not the air-conditioning system, nor the dish-washer, etc.

Conditional flow may refer to time of day, date, demand by neighbors, or any other logical term designed to affect a distinction between well paid utility and unpaid utility. Any combination of all three options is also possible.

Various embodiments include a method to pay for utility consumption on a real-time basis by splitting digital coins at a rate that pays exactly for the utility measure being consumed; the digital coin being latched into a utility usage device equipped with a computing apparatus that matches the consumption of value bits from the latched digital coin to the real time consumption of the utility; the utility flow is stopped when no more payment bits are available.

In various embodiments of this method the split off (paid) value bits are erased, and the utility company is paid when the digital coin is purchased.

In various embodiments of this method the split off (paid) value bits are accumulated in a receiving coin (bit container), and from where they are being returned to the original latched coin, in the event where the utility consumer generates a measure of the utility, which is being sold back to the utility company, as is common with electrical power.

In various embodiments of this method the paying coin is in a form of a tamper-resistant hardware, and a validating cryptographic protocol is used to verify the paying coin as bona-fide.

In various embodiments of this method the paid bits are sent to the utility company which eventually redeems them with the mint.

REVIEW OF THE INVENTION

This invention is a payment system called IOTpay, comprising a payor device and a payee device, and designed to enable effective payment between them, and meet the following requirements:
(i) instant payment,
(ii) variable payment rate,
(iii) high-resolution payment,
(iv) fast transaction time,
(v) at will payment anonymity, and (vi) payment with no administrative tail,
by effecting payment from the payor device to the payee device in response to a billing requirement sent from the payee device to the payor device, doing so through a flow of bits from the payor device to the payee device, wherein each bit regardless of its {0,1} identity carries an agreed upon monetary value, V ($/bit), so that the number M, of bits flowing from the payor device to the payee device, from time point $t_1$ to time point $t_2$ amount to payment of the amount $VM, where the average rate of the payment is $$\$VM/(t_2-t_1),$$

and where the payee device bills the payor device at a rate B(t) from time point $t_1$ to time point $t_2$, and the payor device adjusts the money bit flow of $\Delta m$ bits over a time interval $\Delta T$ to a rate $\Delta m/\Delta t = B(t)/V$ such that:

$$M = \int (\Delta m/\Delta t)^* dt \ldots \text{from } t_1 \text{ to } t_2$$

and where the bit identities {0,1} of the bits flowing from the payor device to the payee device represent the identity of the transacted value, which the payee device subsequently validates by submitting these bits for validation before the mint that minted them.

This payment system is being kicked off instantaneously, supports variable billing rates by the payee device, features high as desired resolution, by adjusting the value V of $/bit; is as fast as the electronic flow of bits; payment is carried out without the payee device having information about the owner of the payor device, and since billing is instantly satisfied, there is no subsequent invoice nor any administrative tail.

In one embodiment of this invention the payor device is a secure hardware wallet trusted by the payee, and where the payee device reads the identity of the payor device before accepting payment.

In another embodiment, the devices are fitted with human-machine interface, wherein the human-machine interface will feature a display screen showing available balance and payment history, and also feature communication buttons for the human owner of the device to enter payment and reporting instructions to the device.

In yet another embodiment the payor device is fitted with ownership verification apparatus which is either an entry port for a security code, or a biometric port, such that no payment is effected before the ownership-verification apparatus is satisfied.

In a particular different embodiment the devices are embedded in a larger system and payment takes place without direct human intervention.

IOTpay may be applied to payment of home and industrial utilities like electricity, gas, and water, where the variable consumption of the utility is represented as a billing requirement, B(t), which is satisfied real time by the variable flow of money bits from the payor device, and where the payee device also includes:

(i) a consumption-to-billing processor,
(ii) paid bits container,
(iii) communication facilities to the mint that minted the paid money bits,
(iv) a utility flow switch,
and where the consumption-to-billing processor has access to any other environmental factors that are used in translating the variable consumption of the utility to the proper billing, and where the bits container is large enough to contain incoming bits for a period of time T by which time the payee device is contacting the mint and verifies the payment, and where the payee device is equipped with a communication port through which it communicates with the remote mint that minted the bits, and thereby the payee device validates the payment and where the payee device has control over a utility flow switch that is being shut off in the event that billing is not responded to with proper payment, and is being reopened when all due money is paid from the payor device to the payee device.

IOTpay may be implemented such that the utility is electrical power and where the billing rate reflects time of day and overall load on the grid, and where the consumer is using a power generation facility of his or her own and to the extent that the this self power generator generates more than the consumer consumes, then the extra power is being sold to the power supply, using the following pay-back system: money bits accumulating in the bit container of the payee device are being reserved for a flow back to the payor device to account for power sold by the consumer to the power supplier.

IOTpay may be implemented over two devices such that the role of the devices is switched at will, the payee device becomes the payor device, and the payor device becomes the payee device.

What is claimed is:

1. A system to execute payment comprising:
a payor device comprising a first processor and a first memory:
and a payee device comprising a second processor and a second memory;
wherein the first memory stores one or more instructions that, when executed by the first processor, cause the payor device to:
hold a string of bits (S), such that each bit in S has a value V and where the identity of each bit in S was randomly assigned from the set {0,1} by a mint that at a previous time loaded S onto the payor device;
determine a first number (p) of bits for a first transacted value;
execute a payment of the first transacted value by transferring the last p bits of S to the payee device, wherein the transfer of the p bits begins at time point t1 and ends at time point t2 at a first rate of payment defined by ((first transacted value)/t2-t1);
determine a second number (p') of bits for a second transacted value;
subsequent to the payment of the first transacted value, execute a payment of the second transacted value by transferring the last p' bits in S to the payee device, wherein the transfer of the p' bits begins at time point t3 and ends at time point t4 at a second rate of payment defined by ((second transacted value)/t3-t4);
wherein the second memory stores one or more instructions that, when executed by the second processor, cause the payee device to:
bill the payor device at the first rate of payment from time point t1 to time point t2 and the second rate of payment from time point t3 to time point t4;

send the bits of S received from the payor device to the mint to validate the identity of the bits of S.

2. The system of claim 1 wherein the payor device passes a unique id of the payor device to the payee device; and
   wherein the payee device trusts the payment before validating it with the mint.

3. The system of claim 1 wherein the payor device and the payee device each include a human-machine interface;
   wherein the human-machine interface features a display screen showing available balance and payment history, and the payor device also features communication buttons for receiving input from a user.

4. The system of claim 1 wherein the payor device is fitted with an ownership verification apparatus which is either an entry port for a security code, or a biometric port, such that no payment is effected before the ownership-verification apparatus is satisfied.

5. The system of claim 1 wherein the payor device and the payee device are embedded in a larger system and payment takes place without direct human intervention.

6. The system of claim 1 wherein the payment is for the use of home and industrial utilities like electricity, gas, and water;
   wherein the payee device also includes:
   (i) a consumption-to-billing processor that computes a billing requirement $B reflecting the monetary value of utility, in the amount C, being consumed, between time point t5 and time point t6;
   (ii) paid bits container: an electronic storage stored in the payee device, where the paid bits are stored in the order transferred from the payor device to the payee device;
   (iii) communication facilities to the mint that minted the paid money bits;
   (iv) a utility flow switch, controlled by the payee device;
   wherein the consumption-to-billing processor has access to all the factors that are used in translating a variable consumption of the utility to the billing reflecting that consumption;
   wherein the paid bits container is large enough to contain incoming bits for an arbitrary period of time T by which time the payee device is contacting the mint via an electronic public communication network and verifies the payment of all the bits that were paid during the last T period;
   wherein the payee device shuts off the utility flow switch in the event that billing is not responded to with due payment, the utility flow switch is being reopened by the payee device when all due money is paid from the payor device to the payee device.

7. The system in claim 6 wherein the utility is an electrical power and where the billing reflects time of day and overall load on a grid;
   wherein the system of claim 6 also includes a power generator (PGF);
   wherein, if the PGF generates more electrical power than a consumer consumes, then an extra power, E, is sold to a power supply, using the following pay-back system:
   the consumption-to-billing processor computes the monetary value U of the extra power E, and the payee device computes a number of bits $r=U/V$, then the payee device transfers to the payor device r money bits that have been accumulated in the paid bit container; and
   the r money bits are transferred from the payee device to the payor device in reverse order.

8. The system of claim 1 wherein a need arises for payment in reverse, and a controller of the payor device and a controller of the payee device agree that the payor device becomes the payee device, and the payee device becomes the payor device.

* * * * *